Dec. 1, 1953
O. S. FRENCH ET AL
2,660,908
IDLER ARM
Filed Feb. 25, 1950
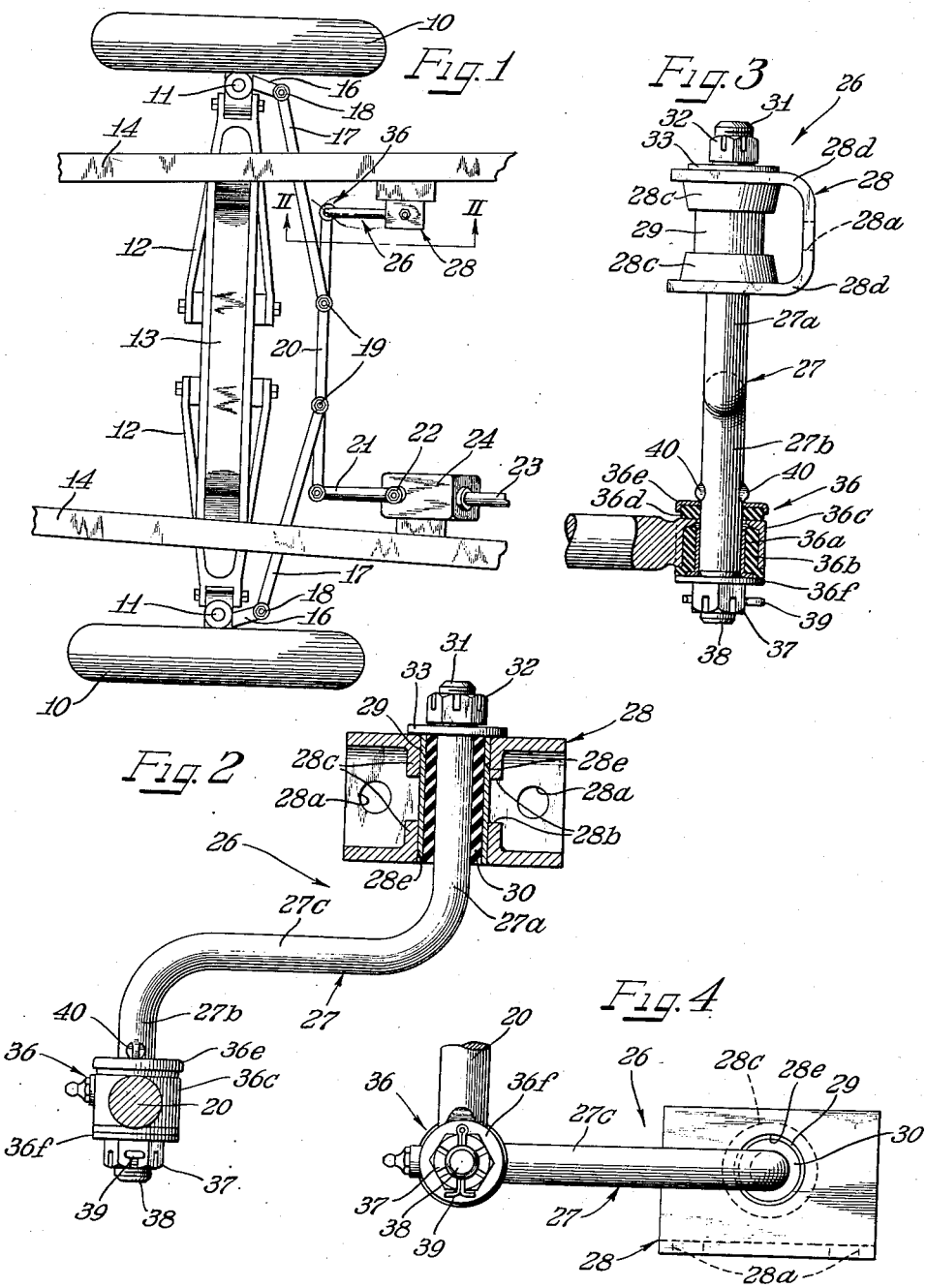
Inventors
Oliver S. French &
Donald P. Marquis
Attys.

Patented Dec. 1, 1953

2,660,908

UNITED STATES PATENT OFFICE 2,660,908

IDLER ARM

Oliver S. French, Detroit, and Donald P. Marquis, Ferndale, Mich., assignors to Thompson Products, Inc., Cleveland, Ohio, a corporation of Ohio Application February 25, 1950, Serial No. 146,194

14 Claims. (Cl. 74—579)

1

The present invention relates generally to an improved steering mechanism for a dirigible vehicle and more particularly relates to an idler arm construction for a parallelogram-type steering linkage, the idler arm incorporating a resilient elastic bearing permitting relative angular movement between two elements without necessitating relative movement between the bearing surfaces thereof.

In the parallelogram-type steering linkage employed on many contemporary dirigible vehicles, a cross link extending transversely of the vehicle frame is actuated at one end by a pitman arm operatively connected to a steering column through a gear box. The free end of the cross link is usually supported by an idler arm assembly so as to promote straight longitudinal movement of the cross link by the pitman arm.

According to the general features of the present invention, a bracket is attached to the frame of the vehicle, preferably the side adjacent the free end of the cross link, and this bracket is provided with a bearing block or housing portion adapted to retain and enclose a resilient elastic bearing sleeve. The idler arm, which may take the form of a bar of steel suitably bent to bring the linkage into proper relationship with the bracket is inserted within the sleeve and the arm is locked to the bracket to preclude inadvertent axial movement relative thereto.

Since the housing portion of the bracket, the resilient elastic sleeve and the idler arm are in snug relationship with one another, the motion of the idler arm, which normally may be through an arc of approximately 90°, will cause no movement between bearing surfaces but will produce only a torsional movement in the bearing sleeve.

It is, therefore, an object of the present invention to provide an idler arm for a vehicular steering assembly in which a bearing joint is provided wherein relative angular displacement of the joint element will produce a torsional movement only in a resilient elastic sleeve or bushing or bearing.

Another object of the present invention is to define an improved process for forming an idler arm assembly for a vehicular steering linkage through which a unique mechanism may be economically produced.

A further object of the present invention is to provide a bearing joint for an idler arm in a vehicular steering assembly which does not require lubrication.

Yet another object of the present invention is to provide a bearing joint for an idler arm in a

2 vehicular steering linkage in which the elements are assembled in a predetermined fixed angular relationship so that binding and freezing between the bearing surfaces is substantially precluded, even though limited angular movement is permitted.

A still further object of the present invention is to provide a novel method of manufacturing an idler arm and mounting the idler arm in a vehicular steering linkage in a vehicle frame, whereby the linkage may be supported in proper geometric relationship relative to a pitman arm operatively connected to another portion of the vehicular steering linkage.

Many other features, advantages and additional objects of the present invention will become manifest to those versed in the art upon making reference to the detailed description which follows in the accompanying sheet of drawings in which:

Figure 1 is a fragmentary top plan view of an automobile chassis having a parallelogram-type steering linkage equipped with an idler arm according to the present invention;

Figure 2 is an enlarged elevational view with parts broken away and with parts shown in vertical cross section taken in the direction of line II—II of Figure 1 and showing the details of construction of the idler arm according to the present invention;

Figure 3 is an enlarged fragmentary end elevational view of the idler arm shown in Figure 2; and Figure 4 is an enlarged fragmentary top plan view of the idler arm shown in Figure 2.

As shown on the drawings:

Referring first to Figure 1, a pair of wheels 10, 10 of a dirigible vehicle are shown supported on stub-axles (not shown) and pivoted on king pins 11, 11. The wheels are supported by wheel arms 12, 12 from a transverse beam 13 of a vehicle frame which also includes side beams 14, 14.

A pair of steering arms 16, 16 extend rearwardly from the stub-axle assemblies of the wheels 10, 10 and are pivotally connected to a pair of tie rods 17, 17 through a ball and socket type joint 18, 18.

The tie rods 17, 17 extend inwardly and are pivotally connected by means of a ball and socket type joint 19, 19 to a cross link 20 pivotally connected at one end to a pitman arm 21 suspended on a rock shaft 22 which may be selectively rotated by a steering column 23 operatively connected to the rock shaft 22 through a gear box 24 affixed to the side beam 14 adjacent thereto.

In order to support the steering linkage in proper geometric relationship and in order to properly transmit a steering load through a change of direction, an idler arm assembly indicated generally by the reference numeral 26 provides a movable joint between the other end of the cross link 20 and one of the side beams 14 of the vehicle frame.

Referring more specifically to Figures 2, 3 and 4, the idler arm assembly 26 is shown as including an idler arm 27 conveniently formed from an ordinary piece of bar stock and shaped in the general configuration of a crank with oppositely extending parallel arm portions 27a and 27b joined by a central portion 27c. The shape and dimensions of the idler arm 27 are intended to bring the linkage into proper relationship with a bearing about to be described.

In the bearing referred to, the arm portion 27a of the idler arm 27 comprises the journal thereof and the bearing block is formed by a bracket indicated generally by the reference numeral 28.

In its original form, the bracket 28 comprises a flat plate of metal which, as shown in this embodiment, is provided with a pair of apertures 28a, 28a situated at or near the central portion of the plate and a second pair of apertures 28b, 28b located on a common center line disposed generally longitudinally with respect to the plate. The apertures 28a and 28b may be suitably formed by punching or drilling as desired.

The metal surrounding the apertures 28b, 28b is subsequently extruded to form a pair of annular embossments indicated by the reference numeral 28c, 28c.

The plate is then shaped by bending into a generally U-shaped configuration as at 28d (Figure 3), to place both of the embossments 28c, 28c into inwardly projecting coaxial relationship with respect to one another. In this manner, the embossments 28c, 28c are spaced from one another and define a bushing bore indicated generally by the reference numeral 28e.

A short section of tubing comprising a tubular retainer 29 or other form of tube-like bushing is employed to bridge the gap between the embossments 28c, 28c and may be press fitted into the bore 28e or otherwise inserted for firm assembly relative to the bracket 28.

The tubing or retainer 29 is lined with a resilient elastic rubber-like material 30 and may be clinched at the ends thereof to form a permanent member integral with the bracket 28.

Under ordinary circumstances, the frictional relationship between the embossments 28c, 28c of the bracket 28, the tubing or retainer 29 and the resilient elastic rubber-like material 30, which comprises a bearing or bushing, and the arm portions 27a of the idler arm 27 frictionally engage one another so as to substantially prevent axial movement of the idler arm 27 with respect to the bracket 28, however, for purposes of safety, the end of the idler arm 27 may be threaded as at 31 to receive a nut 32 to hold a washer 33 in abutting engagement with the bracket 28. A cotter pin 34 may be employed in a well-known manner to lock the nut 32 to the threaded portion 31 of the idler arm 27.

It will be appreciated that the normal motion of the idler arm will result in an angular displacement of the arm 27a through an arc of approximately 90°. According to the present invention, however, there is no movement between bearing surfaces of the bracket 28, the tubular retainer 29, the bearing or bushing 30 and the idler arm 27. All angular displacement of the idler arm will be completely accommodated by torsional movement only in the bearing or bushing 30.

The other end of the idler arm 27 is connected to the cross link 20 by means of a rubber bushed sleeve bearing assembly indicated generally by the reference numeral 36 fixed in predetermined axial position on the arm 27b of the idler arm 27 by locking structure including a nut 37 threaded onto a threaded stem 38 and a cotter pin 39.

The arm portion 27b of the idler arm 27 may be pinched to form ears 40 on the other side of the bearing 36 to provide a retaining boss for the bearing 36.

As shown in Figure 3 the bearing assembly 36 includes a metal sleeve 36a rotatably receiving the portion 27b of the arm. A rubber bushing 36b incased in an eye-type housing 36c on the end of the cross link 20 resiliently supports the sleeve to accommodate some tilting movements. A rubber washer 36d overlies the housing 36c and is covered by a flanged washer 36e abutting the ears 39. A washer 36f is disposed between the bottom of the housing 36c and the nut 37. The bearing assembly 36 will snub rotation of the link 20 about the axis of the arm 27 while permitting misalignment therebetween through the distortion of the rubber bushing 36b and washer 36d. Steering motion is accommodated between the sleeve 36a and the arm portion 27f.

It will be apparent that the idler arm construction of the present invention has many advantages since the bearing between the idler arm 27 and the bracket 28 provides a permanent connection which does not require lubrication and which substantially precludes the magnification or transmittal of rattling noises originating in the steering linkage. Moreover, all of the elements of the assembly may be economically produced from simplified elements, for example, the idler arm may be formed from commercially available bar stock which requires no finishing to produce an accurate bearing surface for the bearing or bushing 30.

It is possible that various minor modifications may appear to persons skilled in the art upon making reference to the details which have been employed to adequately describe this preferred embodiment, however, it should be clearly understood that we wish to embrace within the scope of this patent all such embodiments as reasonably and properly come within the scope of our constribution to the art.

We claim as our invention:

1. In a steering linkage, an idler arm, a plate of metal having a plurality of spaced apertures, the plate of metal being bent into a two-legged element having two of the apertures in spaced coaxial alignment, a tubular element bridging the two apertured legs to form a bracket with a bore and extending through both of the coaxially aligned apertures, and a resilient elastic material lining the bore of the tubular element, the lined tubular element receiving a portion of said idler arm, said elastic material frictionally engaging said tubular element and said idler arm and resisting relative surface displacement therebetween upon relative angular movement of the idler arm with respect to the bracket within the elastic limit of torsional deformation in the elastic material.

2. In combination, an arm, a plate of metal having a plurality of spaced apertures, at least two of the apertures lying on a common center line axis in spaced apart relationship to one another, the peripheral portions of each of said two apertures being axially extended to form an embossment defining a bushing bore in the locale of each of the apertures, said plate being bent into a bracket with both of said embossments in inwardly projecting coaxial relationship with one another, a tube-like bushing element bridging the said embossments to form a bore extending through both of the coaxially aligned apertures, resilient elastic material lining the bore of the tubular element, and said arm having a portion received in the lined tubular element, said elastic material frictionally engaging said tubular element and said arm and resisting relative surface displacement therebetween upon relative angular movement of said arm with respect to said tubular element within the elastic limit of torsional deformation in the elastic material.

3. In combination, an idler arm for a vehicular steering linkage, a plate of metal having a plurality of spaced apertures, at least two of the apertures lying on a common center line axis in spaced apart relationship to one another, peripheral extruding portions around each of said two apertures forming an embossment in the locale of each of the apertures, said plate being bent into a bracket with both of said embossments in inwardly projecting coaxial relationship with one another, a tube-like bushing element press fitted through and supported by the embossments and forming a bridging bore therebetween, and a resilient elastic material lining the bore of the bushing element and receiving the idler arm, said elastic material frictionally engaging said bushing element and said idler arm and resisting relative movement therebetween so that relative movement between the idler arm and the bracket will produce torsional movement only in the resilient elastic material.

4. A bearing assembly which includes a plate of metal having a generally U-shaped configuration and defining a pair of bushing apertures in spaced coaxial alignment through parallel leg portions thereof, a tube-like bushing element through the coaxially aligned apertures forming a bridging bore, and a lining in said bore comprising a resilient, elastic, rubber-like material.

5. A bearing assembly which includes a bracket comprising a plate of metal defining a pair of spaced apart apertures lying on a common center line and having a generally U-shaped configuration with said apertures in spaced apart coaxial alignment, a tubular element bridging the respective legs of the bracket and having the ends thereof received by the apertures, the ends of the tubular element being clinched to integrate same with the bracket, and a resilient elastic rubber-like material lining the bore of the tubular element and forming a bearing surface therefor.

6. An idler arm assembly for a vehicular steering linkage which includes an idler arm, a sleeve of rubber-like material surrounding a portion thereof, a tubular retainer enclosing the rubber-like material, a plate of metal having a plurality of spaced apertures, at least two of the apertures being formed to lie on a common center line axis in spaced apart relationship with one another, and extruding peripheral portions forming embossments in the locale of each of the apertures, the plate having a generally U-shaped bracket form with said embossments in inwardly projecting coaxial relationship with one another to form a bushing bore, the tubular retainer connecting said embossments to place the idler arm and the bracket in assembly with one another.

7. In a vehicular steering linkage, an idler arm, a sleeve of rubber-like material surrounding a portion thereof, a tubular retainer enclosing the rubber-like material, and a bracket adapted to support the idler arm and comprising a plate of metal having a plurality of spaced apertures, the plate being bent to a generally U-shaped configuration so at least two of the apertures are in spaced coaxial alignment, the tubular retainer being press fitted through the coaxially aligned apertures.

8. In a vehicular steering linkage, an idler arm, a rubber-like material surrounding a portion thereof, a tubular retainer enclosing the rubber-like material, a plate of metal having a plurality of spaced apertures, at least two of the apertures being formed to lie in a common center line axis in spaced apart relationship to one another, extruding peripheral portions forming embossments in the locale of each of the apertures, the plate defining a generally U-shaped bracket adapted to support the idler arm and having the embossments in inwardly projecting coaxial relationship with one another to form a bushing bore, the tubular retainer being press fitted through the embossments and supported thereby to form a bridging bore therebetween, and the ends of the tubular retainer being seated in said embossments and being clinched to integrate the idler arm with the bracket.

9. In a joint, a generally U-shaped bracket, each of the extending legs of the bracket having an extruding embossment projecting inwardly in coaxial alignment to define a bushing bore, a tubular element received by and bridging the embossments and a resilient elastic bearing liner on the inside bore of the tubular element.

10. A joint comprising a generally U-shaped bracket, said U-shaped bracket having apertures formed in the extending leg portions thereof, said apertures lying in coaxial relationship with respect to one another, a tubular element bridging the gap between the legs of the bracket and extending into the apertures, a liner frictionally seated in the bore of the tubular element, said liner comprising a rubber-like material, and a rotatable member frictionally seated in said liner whereby angular displacement of said rotatable member relative to the bracket will produce torsional movement only in the rubber-like material.

11. In a joint structure, a bracket, a tubular retainer supported by the bracket and forming a bushing, a rubber-like material lining the bushing, a journal member in the rubber-like material, and means between the journal member and the bracket precluding relative axial movement therebetween in one direction, the ends of the tubular retainer being seated in said bracket and being clinched to integrate the said retainer with the bracket, said rubber-like material frictionally engaging said tubular retainer and said journal member whereby angular displacement of the journal member relative to the bracket will produce torsional movement only in the rubber-like material.

12. An idler arm structure for a vehicular steering linkage comprising a generally U-shaped bracket, the legs of said bracket defining a pair of apertures in coaxial alignment, a tubular element bridging the legs of the bracket and extending into said apertures, a liner of resilient elastic material in the tubular element and an idler arm extending through the tubular element, said liner frictionally engaging said tubular element and said idler arm whereby angular displacement of the idler arm relative to the bracket will produce torsional movement only in the liner.

13. In an idler arm structure for a vehicular steering linkage, a generally U-shaped bracket adapted to connect an idler arm to a vehicle frame member, the legs of said bracket defining a pair of apertures in coaxial relationship with one another, extruding embossments on said bracket and projecting inwardly in the locale of each of said apertures and defining a bushing bore, a tube-like bushing element received in and supported by the embossments and a resilient elastic material lining the tube-like bushing element.

14. In a vehicular steering linkage of the parallelogram type, a cross link extending transversely across a vehicle frame, a bearing on one end thereof, an idler arm connected to said bearing, a sleeve of resilient elastic material surrounding the other end of the idler arm, a tubular retainer enclosing the sleeve, a generally U-shaped bracket defining a tube receiving bore in the legs thereof and carrying the tubular retainer, means between the bracket and the idler arm to preclude axial movement therebetween in one direction and fastening means securing the bracket to the vehicle frame, whereby angular displacement of the idler arm will produce torsional movement only in the resilient elastic sleeve.

OLIVER S. FRENCH.
DONALD P. MARQUIS.

References Cited in the file of this patent

UNITED STATES PATENTS

| Number | Name | Date |
|---|---|---|
| 627,175 | Bradley | June 20, 1899 |
| 681,062 | Loomis | Aug. 20, 1901 |
| 1,103,524 | Marmon | July 14, 1914 |
| 1,318,704 | Sykes | Oct. 14, 1919 |
| 1,607,205 | Lord | Nov. 16, 1926 |
| 1,707,213 | Lord | Mar. 26, 1929 |
| 1,721,288 | Thirty | July 16, 1929 |
| 1,808,358 | Leipert | June 2, 1931 |
| 1,810,972 | Lord | June 23, 1931 |
| 1,862,027 | Lord | June 7, 1932 |
| 1,913,513 | Rossman et al. | June 13, 1933 |
| 2,152,506 | Thorne | Mar. 28, 1939 |
| 2,156,580 | Best | May 2, 1939 |
| 2,308,967 | Kuss | Jan. 19, 1943 |
| 2,346,574 | Guy | Apr. 11, 1944 |
| 2,448,851 | Wharem et al. | Sept. 7, 1948 |
| 2,464,982 | Leighton | Mar. 22, 1949 |
| 2,470,215 | Graham | May 17, 1949 |
| 2,479,339 | Gair | Aug. 16, 1949 |
| 2,488,979 | Kogstrom | Nov. 22, 1949 |
| 2,549,102 | Kramer | Apr. 17, 1951 |

FOREIGN PATENTS

| Number | Country | Date |
|---|---|---|
| 690,626 | France | June 23, 1930 |